US011214328B2

(12) United States Patent
Staal et al.

(10) Patent No.: US 11,214,328 B2
(45) Date of Patent: Jan. 4, 2022

(54) VEHICLE STEERING SYSTEM

(71) Applicant: HONDA MOTOR CO., LTD., Tokyo (JP)

(72) Inventors: Matthew B. Staal, Torrance, CA (US); Nelson Vanwagoner, Santa Monica, CA (US); Jeremy N. Rolon, Redondo Beach, CA (US); Jonathan G. Moss, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 16/370,408

(22) Filed: Mar. 29, 2019

(65) Prior Publication Data
US 2020/0307732 A1    Oct. 1, 2020

(51) Int. Cl.
| | |
|---|---|
| *B62K 5/08* | (2006.01) |
| *B62K 21/00* | (2006.01) |
| *B62D 7/20* | (2006.01) |
| *B62D 7/18* | (2006.01) |
| *B62M 6/40* | (2010.01) |
| *B62K 5/05* | (2013.01) |

(52) U.S. Cl.
CPC ............ *B62K 5/08* (2013.01); *B62D 7/18* (2013.01); *B62D 7/20* (2013.01); *B62K 21/00* (2013.01); *B62M 6/40* (2013.01)

(58) Field of Classification Search
CPC . B62K 5/08; B62K 21/00; B62K 9/02; B62K 7/00; B62D 7/18; B62D 7/20
See application file for complete search history.

(56) References Cited

U.S. PATENT DOCUMENTS

| | | | | |
|---|---|---|---|---|
| 2,837,167 | A | * | 6/1958 | Loofbourrow ........... B62D 5/24 180/427 |
| 8,911,332 | B2 | | 12/2014 | Kraus et al. |
| 9,114,844 | B2 | | 8/2015 | Walter |
| 2004/0140645 | A1 | * | 7/2004 | Hayashi .................... B62K 5/08 280/282 |
| 2016/0229480 | A1 | * | 8/2016 | Mori ......................... B60G 7/02 |
| 2016/0272264 | A1 | | 9/2016 | Mogensen et al. |
| 2018/0265154 | A1 | * | 9/2018 | Mulyadi ................... B62K 5/06 |

FOREIGN PATENT DOCUMENTS

| | | |
|---|---|---|
| DE | 29807196 U1 | 11/1998 |
| DE | 19856408 A1 | 6/1999 |
| KR | 101382701 B1 * | 4/2014 |
| WO | WO 2018/136727 A1 | 7/2018 |

* cited by examiner

*Primary Examiner* — James A English
*Assistant Examiner* — Daniel M. Keck
(74) *Attorney, Agent, or Firm* — Arent Fox LLP (57) ABSTRACT

A vehicle, vehicle frame, and steering system usable with the vehicle and vehicle frame. The steering system including a first and second knuckle mounted to a vehicle frame and configured to rotate with respect to the vehicle frame to turn the wheels, and a pitman arm link rotatable relative to the vehicle frame. The steering system further includes a first tie rod operably connected to the first knuckle to the pitman arm link bracket via a pitman arm and pitman connector, and a second tie rod connecting the second knuckle to the pitman arm link. A pitman connector is rotatably operatively connected to the pitman arm link, wherein the pitman arm thereby transfers pivoting or rotational motion applied via a steering input from the pitman arm to the pitman arm link, to respective knuckles via the first and second tie rods.

20 Claims, 8 Drawing Sheets

VEHICLE STEERING SYSTEM

FIELD OF THE INVENTION

Aspects of the present disclosure relate to a vehicle steering system. More specifically, aspects relate to a vehicle steering system for an electrically or otherwise powered vehicle.

BACKGROUND

As vehicle congestion and associated pollution increases, especially in urban areas, the need exists for alternative transportation. Bicycles are a well know alternative for convenient and efficient transportation. However, the need exists to transport cargo or people who may be otherwise unable to utilize a bicycle as a method of transportation. Light transport vehicles, such as bicycle trailers, are often utilized to transport cargo or children. However, light transport vehicles rely on a bicycle to tow the trailer. Bicycle trailers have several disadvantages, including the need for an attachment mechanism for connection to a bicycle. Further, a bicycle connected to a trailer may be cumbersome and difficult to handle or maneuver in certain situations. Thus, bicycle trailers may be unstable and cumbersome for frequent transport of cargo or children. In addition, bicycle trailers are not practical for transport of adults or for hauling heavier cargo.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

There remains an unmet need in the relate art for a practical vehicle having a vehicle steering assembly that is capable of stable and practical transportation of cargo and/or people.

In accordance with one aspect of the disclosure, a steering system usable with a vehicle and vehicle frame is disclosed. The steering system includes a steering portion having a steering input connected to a vehicle frame and a pitman arm rotatably connected to the vehicle frame and operatively connected to the steering portion. The steering system further includes a pitman link rotatably connected to the vehicle frame and operatively connected to the pitman arm via a pitman connector and a knuckle mounted to the vehicle frame, wherein the knuckle is configured to pivotably rotate relative to the vehicle frame. In addition, the steering system includes a tie rod connecting the knuckle to the pitman arm link.

In accordance with one aspect of the disclosure, a vehicle is disclosed. The vehicle includes a frame having a rear wheel mount, a seat tube, a steering tube, and a U-shaped portion at the front of the frame for receiving a passenger or cargo. The vehicle further includes a first knuckle rotatably mounted to a first arm on the U-shaped portion of the frame and a second knuckle rotatably mounted to a second arm on the U-shaped portion of the frame. The vehicle further includes a steering mechanism for rotating the first and second knuckles with respect to the frame in response to a rotation of a steering member rotatably mounted to the steering tube. The steering mechanism may include a pitman arm link rotatably connected to the vehicle frame and a first tie rod connecting the first knuckle to the pitman arm link. Further, the steering mechanism may include a second tie rod connecting the second knuckle to the pitman arm link and a pitman connector rotatably connected to pitman arm link. A pitman arm, which may be connected to and rotate in response to the rotation of the steering member of the vehicle, may be rotatably connected to the vehicle frame and rotatably connected to the pitman arm link.

In accordance with another aspect of the disclosure, a vehicle frame and steering system is disclosed. The vehicle frame may include a rear wheel mount, a seat tube, and a steering tube extending along a first axis, a first arm connected to a U-shaped portion of the frame and having a first knuckle mounted thereto. The vehicle frame may further include a second arm connected to the U-shaped portion of the frame and having a second knuckle mounted thereto. The first and second knuckles may be connected to the steering system. The steering system may include a pitman arm link rotatably connected to the frame and configured to rotate about a second axis and a first tie rod connecting the first knuckle to the pitman arm link. The steering system may further include a second tie rod connecting the second knuckle to the pitman arm link.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The disclosure relates to various aspects of one or more vehicle steering apparatuses and systems having a low profile, an increased load carrying capacity, and various stability improvements. In one example, a vehicle usable with aspects of the current disclosure includes a frame, a rear wheel, and two front wheels that are steerable via a steering apparatus. The vehicle may be powered via operation of a user sitting on a vehicle seat. The user may steer the front two wheels via a handlebar that is in operable connection with the steering apparatus. Further aspects of an example vehicle steering apparatus in accordance with the present disclosure will be described with relation to the figures below.

Figure 1A:
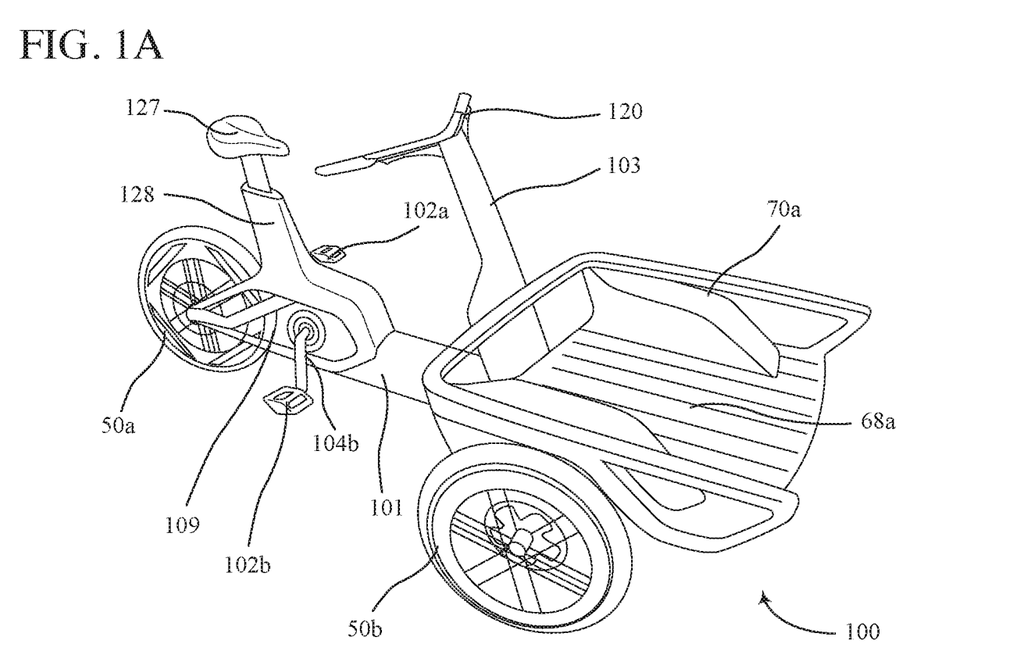
FIG. 1A is a perspective view of a vehicle with an interchangeable cargo carrying portion usable with the steering mechanism in accordance with one aspect of the disclosure.
Figure 1B:
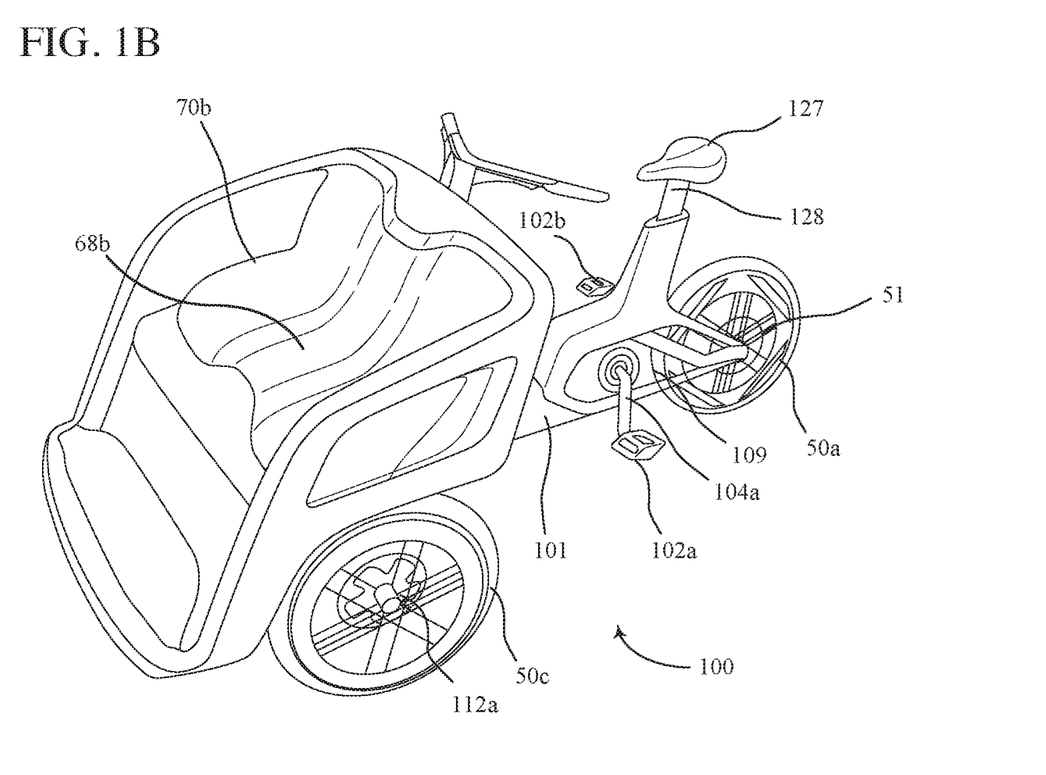
FIG. 1B is a perspective view of a vehicle with an interchangeable passenger carrying portion in accordance with one aspect of the disclosure.
Figure 2:
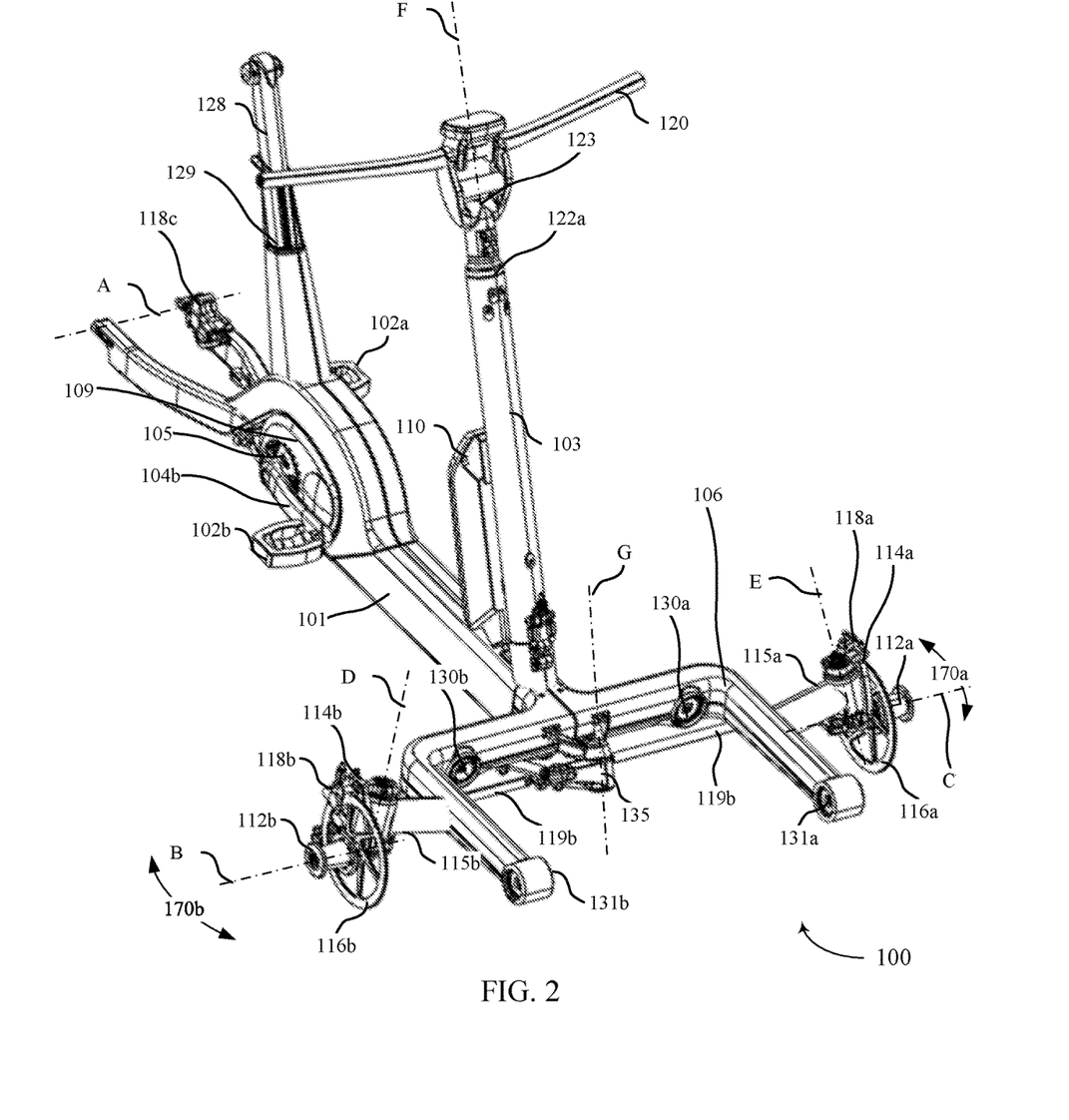
FIG. 2 is a perspective view of a vehicle usable with the steering mechanism in accordance with one aspect of the disclosure.

FIGS. 1 and 2 show one example of a vehicle in accordance with aspects of the present disclosure. While FIGS. 1 and 2 show a vehicle having pedal features (e.g., pedal powered, starting, or assist), a "vehicle," as used herein is not limited to such a vehicle having pedals, and refers to any moving vehicle that is powered by any form of energy. A vehicle may carry human occupants or cargo or both.

FIGS. 1A and 1B show a broad overview of the vehicle 100 usable with the current disclosure. It is noted that at least one example and/or further details for a number of the components referenced in the vehicle 100 in FIGS. 1A and 1B are described in further detail with reference to FIGS. 2-8. As shown in FIGS. 1A and 1B, an example vehicle 100, may be configured to have an interchangeable passenger carrying portion (e.g., reference 70*b* in FIG. 1B) and/or a cargo carrying portion (e.g., reference 70*a* in FIG. 1A) mounted thereto, such as on or in the area of U-shaped portion 106. As best shown in FIGS. 1A and 1B, the interchangeable passenger/cargo carrying portion may for example include a seat 68*b* (FIG. 1B) for carrying a single or multiple passengers and/or provide a cargo area 68*a* (FIG. 1A) for storage and/or transportation of cargo via the vehicle 100. One example of an interchangeable cargo carrying portion is further disclosed in U.S. patent application No. X, titled "Convertible Passenger and Cargo Area for Vehicle," filed on X, and U.S. patent application No. X, titled "Active Vehicle Footrest," filed on Mar. 29, 2019; the entirety of which are both incorporated by reference herein.

As best shown in FIGS. 1A and 1B, the vehicle 100 may include a rear wheel 50*a* and a pair of front wheels 50*b* and 50*c*. A "wheel" or "wheels" as used herein may include a hub and extending surface (e.g., disk) to a rim. In one non-limiting example implementation, the hub may be connected to the rim via a series of tensioned spokes and/or other features. The rim may be configured to receive an inflatable tire, which may or may not be configured to contain an inflatable tube. As an alternative, the tire may be formed of a solid elastic material, and/or a material having a plurality of open and/or closed cells within an elastic material, which may include rubber, for example. The wheel hub, disk, spokes, and/or wheel hub may be formed of a metallic material, a plastic material, a composite material, or any combination thereof. Further, frame 101 as discussed herein may comprise a rigid or semi-rigid material, such as one or more plastic, composite, metals, or combinations thereof. The vehicle 100 may further include a steering tube 103 and a steering portion 120, which may for example be a handlebar. The vehicle seat may further include a seat 128 mounted to a seatpost 128.

Turning to FIGS. 1A, 1B, and 2, the rear wheel 50*a* (FIGS. 1A and 1B) and the two front wheels 50*b* and 50*c* (FIGS. 1A and 1B) of vehicle 100 may rotate about axes B and C (FIG. 2). Each of the front wheels 50*a* and 50*b* (FIGS. 1A and 1B) may include hub(s) 112*a* and 112*b*, as best shown in FIG. 2, that are mountable via knuckles 114*a* and 114*b*, respectively, to U-shaped portion 106 of the vehicle frame 101. One example of knuckles 114*a* and 114*b*, which may be interchangeably referred to as knuckle assemblies, are further described below with relation to the magnified view in FIG. 6. Each hub 112*a* and 112*b* may have a respective brake disk 116*a* and 116*b* mounted for operation in relation thereto. Each brake disk 116*a* and 116*b* may be configured to be selectively provided with a friction or other resistive force, such as via respective brake calipers 118*a* and 118*b* configured to provide selective clamping force to each brake disk 116*a* and 116*b* so as to prevent movement of the wheels. Alternatively, other non-frictional force may be used for such braking power, such as electro-magnetic based resistive force.

While not shown in FIG. 2, a similar brake disk or other braking configuration as described with relation to the rotation of front wheels 50*b* and 50*c* (FIGS. 1A and 1B) about axes C and D (FIG. 2) may be mounted to the rear of the frame 101, thereby similarly allowing braking to be applied to a rear wheel rotating about axis A. For example, a rear brake caliper 118*c*, which may be similar to front brake caliper(s) 118*a-b*, may also be located and configured to selectively clamp a brake disk in order to provide a friction force to the brake disk to inhibit rotation of the rear wheel, thereby providing a stopping force to the vehicle 100. Each of brake calipers 118*a*, 118*b*, and 118*c* may provide a resistive force to each wheel in response to a user of the vehicle depressing a brake lever or other braking mechanism (not shown). In one example, both front brake calipers 118*a* and 118*b* may provide a clamping force to disks 116*a* and 116*b* respectively in response to a user depressing a first brake lever (not shown) mounted proximal to a first end of handlebar 120. Rear caliper 118*c* may be configured to apply a clamping force to a rear brake disk (not shown) mounted to a rear wheel 50*a* FIGS. 1A and 1B) rotating about axis A (FIG. 2) in response to a user depressing a second brake lever (not shown) mounted proximal to a second end of handlebar 120.

As indicated above, each of front hubs 112*a* and 112*b* may be rotatably mountable to a respective knuckle 114*a* and 114*b*, and each respective knuckle 114*a* and 114*b* may be rotatably mounted to arms 115*a* and 115*b* and configured to pivot with respect to frame 101. For example, such rotation of knuckles 114*a* and 114*b* may be in rotational directions denoted by arrows 170*a* and 170*b* about axes E and D, respectively. Brake calibers 118*a* and 118*b* and hubs 112*a* and 112*b*, along with corresponding wheels 50*b* and 50*c* (FIGS. 1A and 1B) may be mounted to each respective knuckle or knuckle assembly 114*a* and 114*b* and similarly rotate therewith about axes E and D, respectively. As discussed in further detail below, a rotational force applied by a user, for example, to handlebar 120 may cause each hub 112*a* and 112*b*, and thus each respective wheel and other corresponding features, pivot in directions denoted by arrows 170*a* and 170*b*, so as to allow the vehicle to turn in a desired direction.

The vehicle frame 101 may further include a seat tube 129 for receiving a seat post 128. The seat post 128 may be configured to have a seat 127 (FIGS. 1A and 1B) mounted thereto. The seat post 128 may be configured to telescope within seat tube 129, thereby allowing for adjustment of the seat height of the vehicle 100. The vehicle 100 may include pedals 102a and 102b, which may be rotatably connected to a corresponding first 104a and second crank 104b. The cranks 104a and 104b may be rotatably connected to a shaft extending from the vehicle frame 101. The shaft may also be connected to a sprocket 105 that is configured to mesh with a chain or belt (not shown) for driving the rear wheel (not shown) about axis A. The vehicle 100 may alternatively or also be equipped with an assist motor 109, such as an electric or other powered motor. The motor 109 may be selectively operable via the pedals 102a, 102b, for example, to provide starting motion and/or additional rotational force for driving the rear wheel 51a (FIGS. 1A and 1B) that rotates about axis A (FIG. 2).

In one example implementation, the motor 109 may be selectively electrically powered by battery 110. However, the motor 109 and rotational cranks 104 and sprocket 105 shown in FIG. 1 serve only as one example implementation. For example, as an alternative to or in addition to motor 109, a motor may be located proximal to or within a rear hub that rotates around axis A. Further, as an alternative to or in addition to the aforementioned examples, one or more motors may be located proximal to or at one of or both of front hubs 112a and 112b. In another aspect of the disclosure, the battery 10 may for example be implemented into the frame 101 and/or the interchangeable passenger carrying portion (e.g., reference 70b in FIG. 1B) and/or the cargo carrying portion (e.g., reference 70a). In one example, the interchangeable carrying portions (e.g., 70a and 70b) may include batteries of different capacities and the frame and interchangeable carrying portion may include corresponding connectors and/or connection terminals (not shown) to operatively connect each battery with the motor 109 when a specific interchangeable carrying portion is mounted to the vehicle frame 101.

The interchangeable passenger/cargo carrying portions 70a or 70b (FIGS. 1A and 1B) may be mounted to and supported by U-shaped portion 106 (FIG. 2) via rear mounts 130a and 130b. The rear mounts 130a and 130b may, for example, each include a substantially concave receiving portion for assisting in receiving and directing corresponding first and second protruding extensions from the interchangeable cargo carrying portions 70a and/or 70b (FIGS. 1A and 1B) into receiving locking openings in mounts 130a, 130b, that help properly position the passenger/cargo carrying portion. In addition, the U-shaped portion 106 of the vehicle frame 101 may further include side mounts 131a and 131b. The side mounts 131a and 131b may, for example, comprise a through hole for receiving a mounting pin or bolt for mounting a corresponding third and fourth received portion of the interchangeable passenger/cargo carrying portion 70a or 70b (FIGS. 1A and 1B) in conjunction with positioning via the rear mounts 130a, 130b. Thus, rear mounts 130a and 130b and front mounts 131a and 131b allow for interchangeable mounting of one or more different types of cargo carrying portions (e.g., 70a or 70b) to vehicle frame 101, for example.

In order to keep the load floor of the cargo carrying portion supported by U-shaped portion 106 low, the steering mechanism of vehicle 100 may advantageously be located below U-shaped portion 106 of frame 101. Further, by maintaining the steering mechanism of vehicle 100 at a location below the U-shaped portion 106 of frame 101, the interchangeable cargo carrying portion may be removed and installed without any risk of damage to the steering components and/or the cargo carrying portion. In addition, for proper weight distribution of the vehicle 100 when a cargo carrying portion is mounted to frame 101, such as when carrying passengers, for example, it may be advantageous to have the rotation axis B and C of each front wheel located well forward of the rotation axis F of handlebars 120, such as with relation to a forward travel direction of the vehicle 100. Further advantages of the steering mechanism of the current disclosure include but are not limited to adjustability of steering geometry (e.g., toe, Ackerman geometry) improved steering mechanism efficiency for reduced user effort; improved steering system durability and reliability; and improved steering system performance. FIGS. 3-8 show further detail of an example steering mechanism usable with vehicle 100, along the lines as shown in FIGS. 1A, 1B, and 2.

Figure 3:
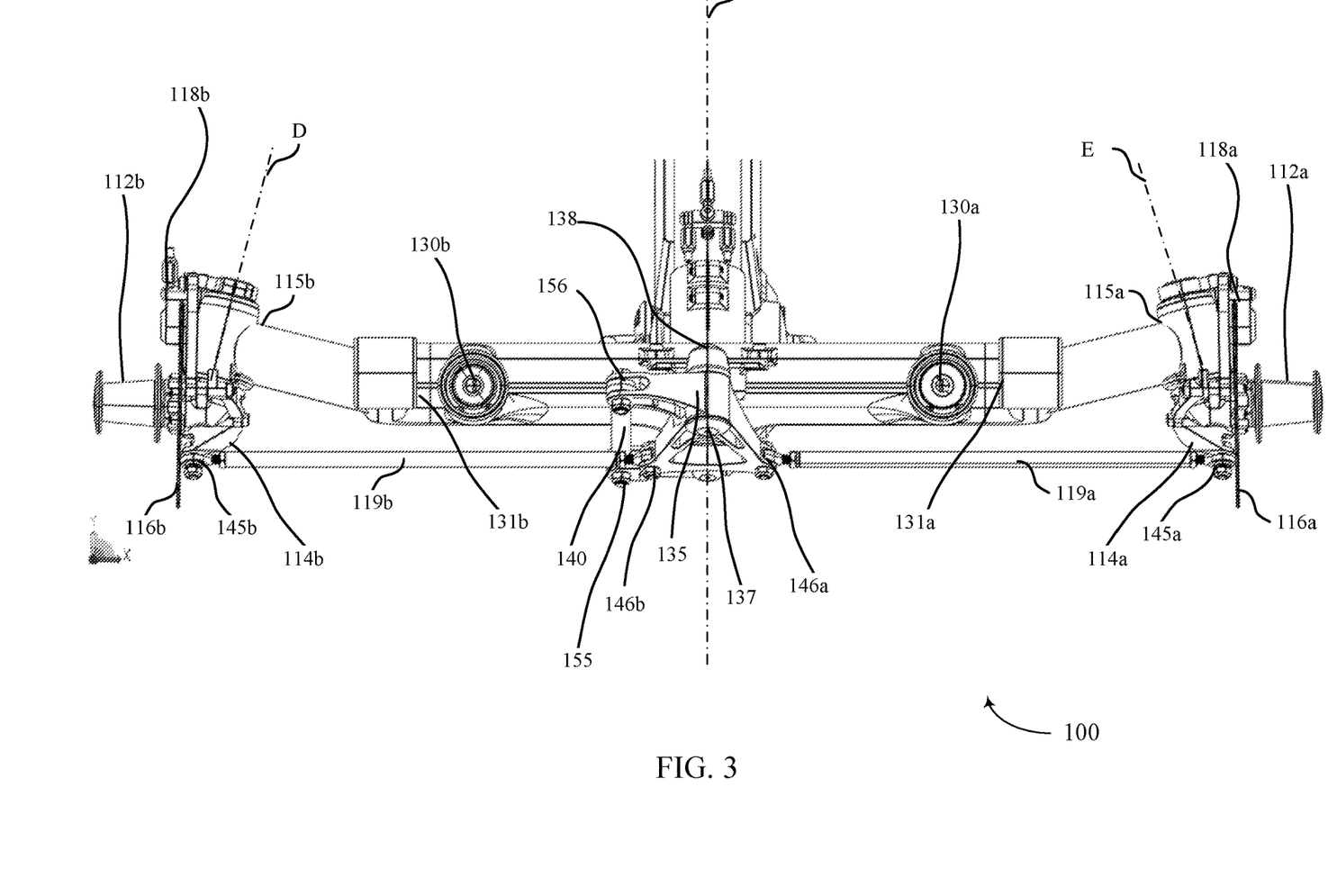
FIG. 3 is front view of the vehicle frame and steering mechanism shown in FIGS. 1 and 2.
Figure 4:
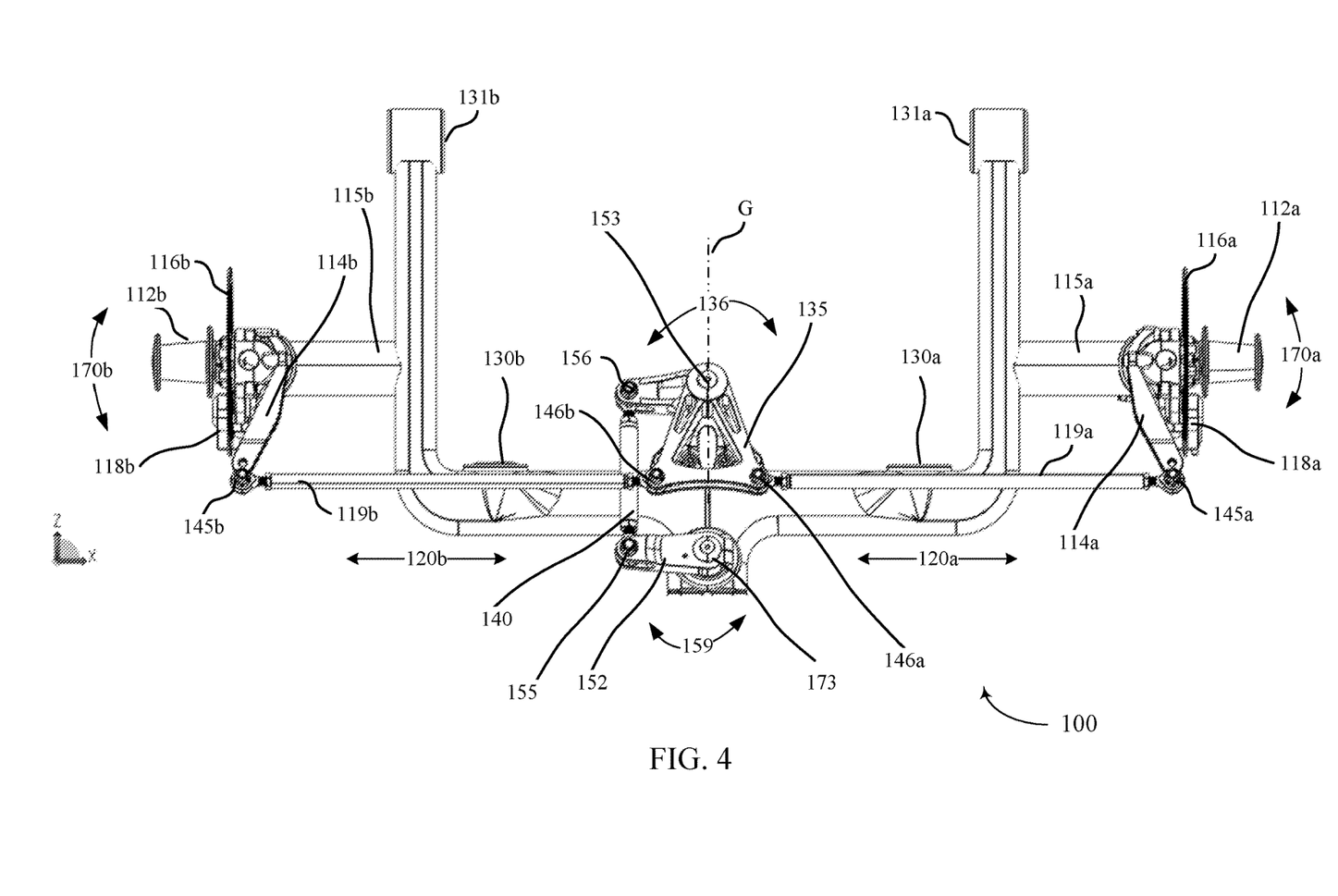
FIG. 4 is bottom view of the vehicle frame and steering mechanism shown in FIGS. 1-3.
Figure 5:
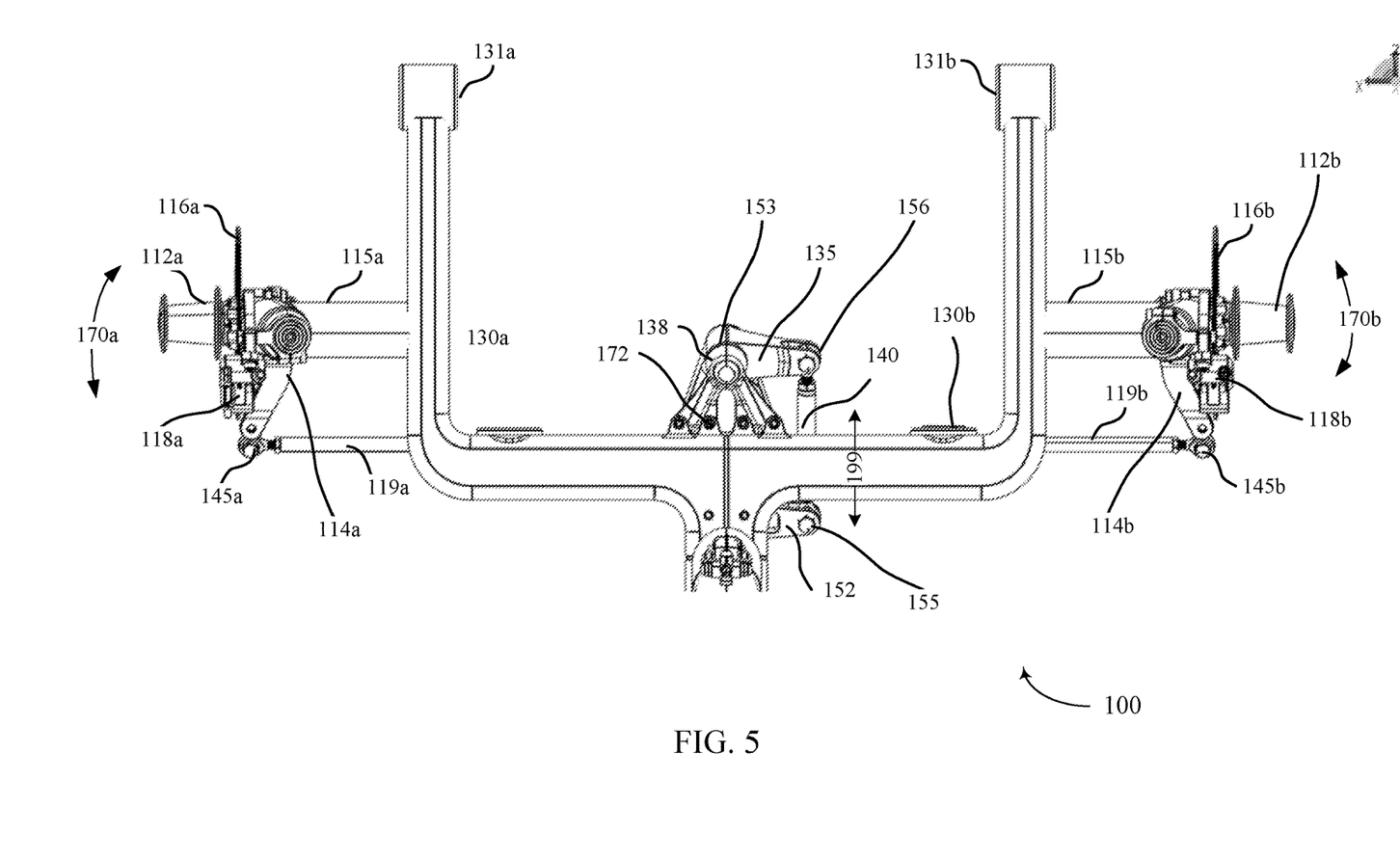
FIG. 5 is top view of the vehicle frame and steering mechanism shown in FIGS. 1-4.

As shown in FIGS. 1-8, and as best shown in FIGS. 1-2 and 4, the pitman arm 152 and handlebar 120 (FIGS. 1A, 1B, and 2) may be mounted to a steering shaft 173 that may be rotatably mounted within and coaxial with the steering tube 103 of frame 101, as best shown in FIG. 2. The steering shaft 173 may extend from the handlebar mount 123 to pitman arm 152 (FIG. 4). Each knuckle 114a and 114b may be operatively attached to respective tie rods 119a and 119b. Further, each tie rod 119a and 119b may be mounted to pitman link 135. Pitman link 135 may be connected to pitman arm 152 via a pitman connector 140. The pitman link 135 may be pivotally mounted to frame 101 be configured to rotate about pivot G (FIG. 3). The pitman link 135 may thus be configured to translate a rotational motion received from the pitman arm 152 to a linear motion at rotatably connected tie rods 119a and 119b. The linear motion of each tie rod 119a and 119b is translated to each connected knuckle 114a and 114b so as to produce pivoting motion of each knuckle 114a and 114b about axes E and D, respectively (see, e.g., FIG. 2).

During operation, a user of vehicle 100 may rotate handlebars 120 (FIG. 1) to steer both front wheels (not shown) so as to rotate about corresponding axes C and D. In one example operation of the aforementioned vehicle, steering may be achieved by rotating handlebar 120 about axis F (FIG. 2). As shown in FIG. 3, for example, rotation of the handlebar about axis F (FIG. 2), causes a rotation of pitman arm 152 in a respective direction(s) 159. Rotation of pitman arm 152 causes pitman link 135 to rotate about axis G in corresponding directions denoted by arrows 136. The rotation of pitman link 135 thereby causes each tie rod 119a and 119b to move in a corresponding directions denoted by arrows 120a and 120b. Movement of each tie rod 119a and 119b in either direction 120a and 120b in turn causes each knuckle 114a and 114b to pivot in corresponding directions denoted by arrows 170a and 170b. Thus, the aforementioned steering features interoperate to allow a user of vehicle 100 to steer both front wheels together via pivoting of hubs 112a and 112b (FIG. 2) via operation of handlebars 120 (FIG. 1), for example. It is noted that the aforementioned explanation is a broad overview of one example operation of the steering system of the current disclosure. Further detail of example components and operations are described below.

The interface that allows handlebars 120 (FIG. 1) and pitman arm 152 (FIG. 3) to rotate with respect to steering tube 103 (FIG. 1) may, for example, include a headset similar to that used in bicycle or motorcycle applications. As shown in FIG. 2, a headset, may for example include a top bearing 122a and bottom bearing 122b (FIG. 6), that allows for pivoting of the handlebar 120 and pitman arm 152, while limiting linear movement thereof. However, the interface between the steering tube 103 and aforementioned steering shaft 173, handlebar mount 123 (FIG. 1), and pitman arm 152 (FIG. 6), is not limited to as shown in FIGS. 2-8 and may include other types of interface. Some examples of such alternative interface features may include a single, plurality, or any combination of ball bearings, which may include any one or a combination of deep-groove bearings, angular contact bearings, self-aligning bearings and/or thrust ball bearings; and/or spherical roller bearings; cylindrical roller bearings; tapered roller bearings; needle bearings; conical bearings; and/or bushings.

Figure 6:
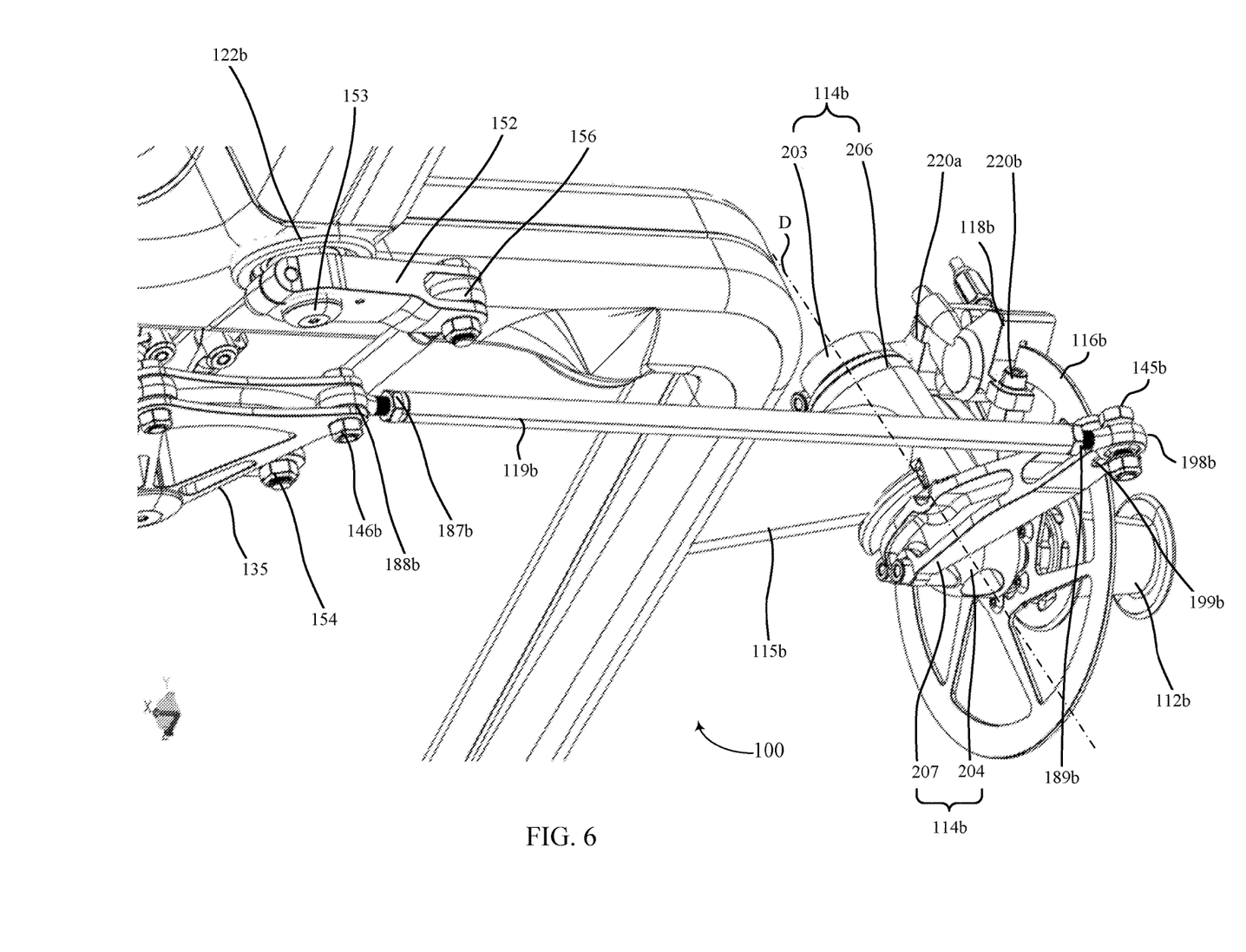
FIG. 6 is close-up perspective bottom view of a portion of the vehicle frame and steering mechanism shown in FIGS. 2-5.

FIG. 6 shows a close-up of various features of the vehicle and steering mechanism shown in FIGS. 2-5, 7, and 8. While FIG. 6 primarily shows only one side of the steering mechanism, similar components may be included on both sides of the steering mechanism. As shown in FIG. 6 a first end of tie rod 119b may include a joint 188b to operatively link the linear motion of the tie rod 119b to the pivoting motion of the pitman link 135 as best shown by arrows 136, and 120a and 120b in FIG. 4 and arrow 199 in FIG. 5. The joint 188b, may, for example, be or include a heim joint, rod end bearing or other joint allowing two or more degrees of movement of the joint with relation to a through bolt 146b. However, any other suitable type of joint may be used. For example, joint 188b may be or include a johnny joint, a ball joint, or a bushing comprising rubber or urethane and having through hole for receiving bolt 146b, to name a few examples. Joint 198b, at a second end of tie rod 119b, is shown disconnected from knuckle 114b in FIGS. 3-6 to show through hole 199b (best shown in FIG. 6); however, similarly to joint 188b, the tie rod 119b may be connected to knuckle 114b via a through bolt 145b passing through joint 198b and through hole 199b in knuckle 114b. Similarly to joint 188b, joint 198b may be a heim joint rod end bearing, or other joint allowing two or more degrees of movement of the joint with relation to a through bolt 145b. However, any other suitable type of joint, including but not limited to the previously mentioned joints may be used.

Figure 7:
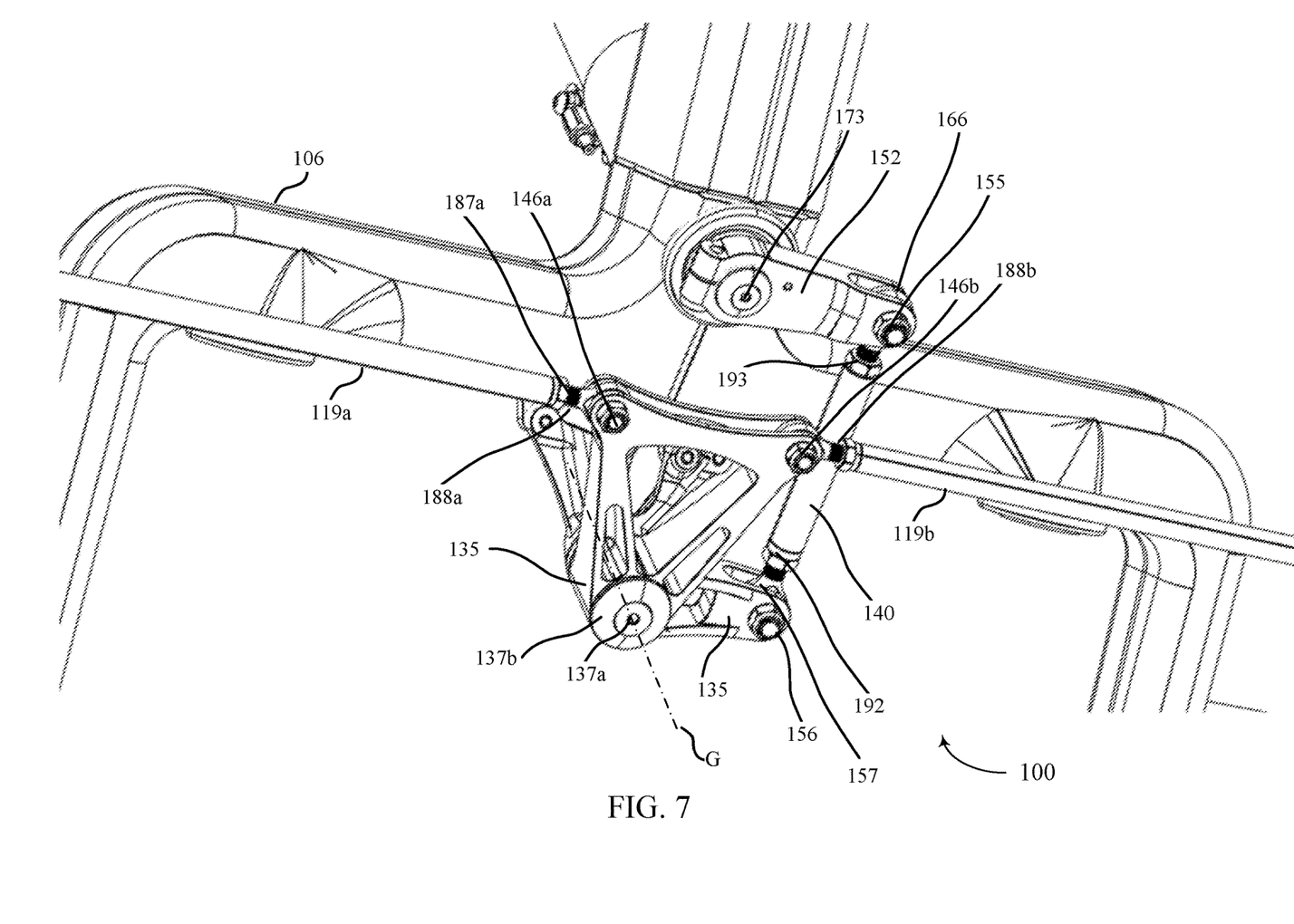
FIG. 7 is another close-up perspective bottom view of portion of the frame and steering mechanism shown in FIGS. 2-6.
Figure 8:
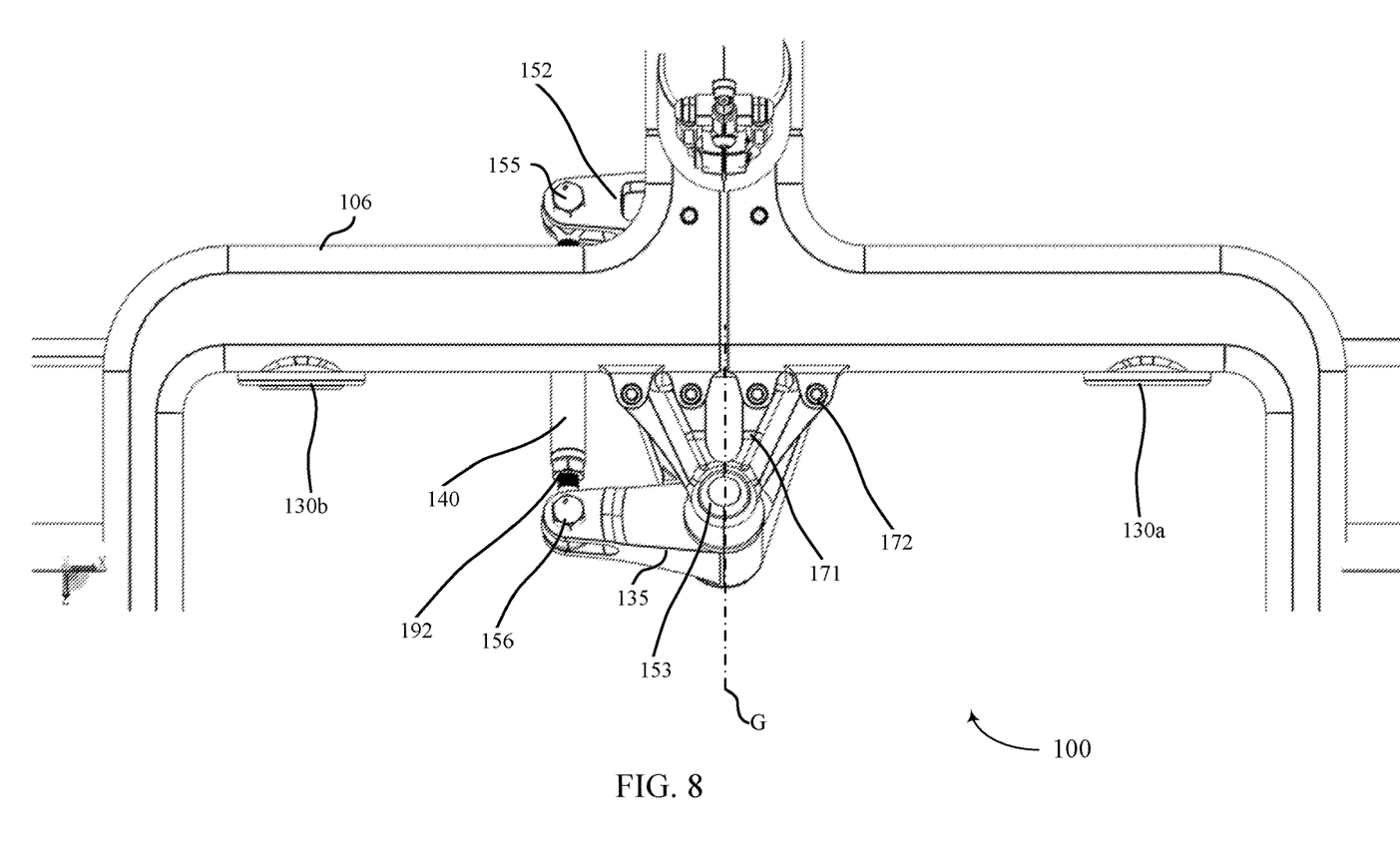
FIG. 8 is close-up bottom view of portion of the vehicle frame and steering mechanism shown in FIGS. 2-7.

As best shown in FIGS. 6-8, joints 188b, and 198b may be threadably engaged with tie rod 119b and include corresponding jamb nuts 187b and 189b. Through the abovementioned structure, each joint 188b and/or 198b may be threaded or unthreaded from tie rod 119b to adjust the overall length of the tie rod 119b. For example, jamb nuts 187b and 189b may be tightened against each corresponding tie rod end to lock each joint 188b and/or 198b into place relative to the tie rod body thereby allowing for ease of adjustment of the steering geometry (e.g., toe) of each respective knuckle 114a, 114b and corresponding wheel.

As shown in FIGS. 2-6, each knuckle 114a and 114b may be connected to arms 115a and 115b at U-shaped portion 106 of frame 101 (FIG. 1). Each knuckle 114a and 114b may be rotatably mounted to each arm 115a and 115b and configured to rotate about axes E and D respectively. FIG. 6 is enlarged to show, amongst other details, one example interface between knuckle 114b, which may be an knuckle assembly, and arm 115a. While only one knuckle assembly 114b and arm 115b are shown in FIG. 6, similar corresponding structures and elements may be applicable at the interface between a knuckle assembly 114a and arm 115a (see, e.g., FIG. 1). As shown in FIG. 6, in one aspect a knuckle assembly 114b may include a knuckle top portion 203 and a knuckle bottom portion 204 providing a double sheer interoperation to arm 115b. In one example, the top portion 203 and bottom portion 204 of knuckle assembly 114a may be connected via a cylindrical connection member or rod (not shown, as internal to cylindrical portion 206) extending lengthwise along axis D. The cylindrical connection member or rod may be configured to be received within the receiving cylindrical portion 206 attached to arm 115b. The interface between the cylindrical connection member (not shown), top portion 203 and/or the bottom portion 204 with the receiving cylindrical portion of arm 115b may be any type of interface structure allowing for pivoting or rotational motion of knuckle 114b relative to arm 115b, while limiting linear movement in the axial direction D thereof. Some of examples of such an interface may include a single, plurality, or any combination of ball bearings, which may include any one or a combination of deep-groove bearings, angular contact bearings, self-aligning bearings and/or thrust ball bearings, spherical roller bearings; and/or cylindrical roller bearings; tapered roller bearings; needle bearings; conical bearings; and/or bushings. In addition, the knuckle 114b may include a spindle (hidden from view) and/or spindle receiving portion for mounting of wheel hub 112b and/or brake disk 116b relative thereto. Such spindle may be attached to or extend from knuckle bottom portion 204. The knuckle assembly 114b may further include a tie rod mounting arm 207, that may be connected via fasteners, welded, molded and/or otherwise rigidly connected to the bottom knuckle portion 204. As discussed in detail above, the tie rod mounting arm 207 of the knuckle assembly 114b may be mounted to tie rod 119 via a joint 198b and through bolt 145b. The knuckle or knuckle assembly 114b may also include brake caliper mounting extensions 220a and 220b for fastening and/or receiving a fastener in order to mount a brake caliper 118b to knuckle 114b.

Turning to FIGS. 7 and 8, each first tie rod joint 188a and 188b may be rotatably connected to pitman link 135 via openings therein using through bolts 146a and 146b. Pitman link 135 may be rotatably connected to pitman arm link bracket 171 (FIG. 8), which may in turn be connected to the U-shaped portion 106 of frame 101 (FIG. 1). The pitman arm link bracket 171 may be integral with the frame 101, or as best shown in FIG. 7, may be rigidly connected to the U-shaped portion 106 of frame 101 via one or a series of fasteners 172. In one example, pitman arm link bracket 171 may be welded, or formed integral with frame 101. The pitman link 135 may be rotatably connected to the pitman link arm bracket via an interface that allows for rotation of the pitman 135 link around axis G, for example. In one example, the pitman link bracket 171 may include cylindrical spindle 153 having a length along axis G, and configured to receive a cylindrical receiving portion of pitman link 135. The interface between the spindle 152 and the cylindrical receiving portion may include an interface comprising a single, plurality, or any combination of ball bearings, which may include any one or a combination of deep-groove bearings, angular contact bearings, self-aligning bearings and/or thrust ball bearings, spherical roller bearings; and/or cylindrical roller bearings; tapered roller bearings; needle bearings; conical bearings; and/or bushings. Further, the spindle 153 may be threaded to receive a spindle bolt 137a and spindle collar 137b for mounting the pitman link 135 to the pitman link bracket 171 and providing a rotatable single sheer interoperation with the spindle 153/link bracket 171 and pitman link 135. However, the pitman link bracket 171 and pitman link 135 are not limited to the elements above and may be or include any type of interface structure allowing for rotation of pitman link 135 with relation to pitman arm link bracket 171 about axis G, while limiting linear movement along axis G.

The pitman link 135, may for example be connected to a pitman arm 152 via a pitman connector 140. As shown in FIG. 6, pitman connector 140 may include joints 157 and 166 as the interface between the pitman connector 140 and the pitman arm 152 and pitman link 135. Either one of or both of joints 166 and 157 may for example be a heim joint, rod end bearing, or other joint allowing two or more degrees of movement of the joint with relation to through bolts at 155 and 156. However, any other suitable type of joint may be used. As best shown in FIG. 7, joints 157, and 166 may be threadably engaged with pitman connector 140 and include corresponding jamb nuts 192 and 193. Through the aforementioned structure each joint 157 and/or 166 may be threaded or unthreaded from pitman connector 140 to adjust the overall length pitman arm connector 140 via jamb nuts 192 and 193 may be tightened against each corresponding pitman arm connector end to lock each joint 157 and/or 166 into place thereby allowing for ease of adjustment of the steering geometry (e.g., steering center).

This written description uses examples to disclose aspects of the disclosure, including the preferred aspects, and also to enable any person skilled in the art to practice the present disclosure, including making and using any devices or systems and performing any incorporated methods. The patentable scope hereof is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various aspects described, as well as other known equivalents for each such aspect, can be mixed and matched by one of ordinary skill in the art to construct additional aspects and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, or B and C, or A and B and C, where any such combinations may contain one or more member or members of A, B, or C.

PARTS LIST FOR FIGURES

| Number | Part Names |
| --- | --- |
| 50a, b, c | wheels |
| 70a, b | cargo/passenger carrying portion |
| 68a | cargo area |
| 68b | passenger carrying portion seat |
| 100 | vehicle |
| 101 | vehicle frame |
| 102a, b | pedals |
| 103 | steering tube |
| 104a, b | cranks |
| 105 | sprocket |
| 106 | U-shaped portion |
| 109 | motor |
| 110 | battery |
| 112a, b | front hubs |
| 114a, b | knuckles |
| 115a, b | arms |
| 116a, b | brake disks |
| 118a-c | brake calipers |
| 119a, b | tie rods |
| 120 | handlebar |
| 122a | top bearing |
| 122b | bottom bearing |
| 123 | handlebar mount |
| 127 | seat |
| 128 | seat post |
| 129 | seat tube |
| 135 | pitman link |
| 137a | spindle bolt |
| 137b | spindle collar |
| 140 | pitman connector |
| 145a, b | bolts |
| 146a, b | bolts |
| 152 | pitman arm |
| 153 | pitman bracket spindle |
| 157 | joint |
| 166 | joint |
| 171 | pitman arm link bracket |
| 172 | Fasteners |
| 173 | steering shaft |
| 187b | jamb nut |
| 188a, b | tie rod joints |
| 189b | jamb nut |
| 192 | jamb nut |
| 193 | jamb nut |
| 198b | joint |
| 199b | hole |
| 203 | knuckle top portion |
| 204 | knuckle bottom portion |
| 206 | receiving cylindrical portion |
| 220a, b | brake caliper mounting portions |

What is claimed is:

1. A steering system for a vehicle, comprising:
a steering portion having a steering input connected to a vehicle frame via a steering tube that extends along a first axis and configured to rotate about the first axis;
a pitman arm rotatably connected to the vehicle frame and operatively connected to the steering portion and configured to rotate about the first axis;
a pitman arm link having a first tie rod connection portion at a pitman arm link first end portion and a second tie rod connection portion at a pitman link arm link second end portion that is distal from the first tie rod connection portion, wherein the pitman arm link is connected to the vehicle frame and operatively connected to the pitman arm via a pitman connector;
a first knuckle mounted to the vehicle frame, wherein the first knuckle is configured to pivotably rotate relative to the vehicle frame;

a second knuckle mounted to the vehicle frame, wherein the second knuckle is configured to pivotably rotate relative to the vehicle frame;

a first tie rod connected to the first tie rod connection portion and connecting the first knuckle to the pitman arm link, wherein the first tie rod extends between the first knuckle and the first connection portion of the pitman arm link; and a second tie rod connected to the second tie rod connection portion and connecting the second knuckle to the pitman arm link, wherein the second tie rod extends between the first knuckle and the second connection portion of the pitman arm link.

2. The steering system of claim 1, wherein the first knuckle is rotatably connected to the first tie rod, and the first tie rod is rotatably connected to the pitman arm link.

3. The steering system of claim 1, wherein the first and second tie rods, pitman arm link, pitman connector, and pitman arm are below the frame of vehicle when the vehicle is in an in-use orientation.

4. The steering system of claim 1, wherein the pitman arm link is mounted to the vehicle frame via a pitman arm link bracket.

5. The steering system of claim 1, wherein the first and second knuckles are rotatably mounted to respective first and second arms of the vehicle frame, wherein the first and second arms are connected to a U-shaped portion of the vehicle frame.

6. The steering system of claim 5, wherein the first and second tie rods, pitman arm link, and pitman connector are below the U-shaped portion of the vehicle frame when the vehicle is in an in-use orientation.

7. A vehicle comprising:
a frame having a rear wheel mount, a seat tube, a steering tube, and a U-shaped portion at the front of the frame for receiving vehicle cargo;
a first knuckle rotatably mounted to a first arm, wherein the first arm extends from the U-shaped portion of the frame;
a second knuckle rotatably mounted to a second arm, wherein the second arm extends from the U-shaped portion of the frame;
a steering mechanism for rotating the first and second knuckles with respect to the frame in response to a rotation of a steering member rotatably mounted to the steering tube, the steering mechanism comprising:
a pitman arm link rotatably connected to the vehicle frame;
a first tie rod extending between and connecting the first knuckle to a first connection portion of the pitman arm link, wherein the pitman arm link further comprises a second tie rod connection portion that is distal from the first tie rod connection portion for connection to a second tie rod;
a second tie rod extending between and connecting the second knuckle to the pitman arm link via the second tie rod connection portion;
a pitman connector rotatably connected to the pitman arm link; and
a pitman arm rotatably connected to the vehicle frame and rotatably connected to the pitman arm link, wherein the pitman arm is connected to, and rotates along with the steering member of the vehicle.

8. The vehicle of claim 7, wherein the first knuckle is rotatably connected to the first tie rod and the second knuckle is rotatably connected to the second tie rod, wherein the first and second tie rod are rotatably connected to the pitman arm link.

9. The vehicle of claim 7, wherein the pitman arm link comprises:
a first tie rod connection portion connected to the first tie rod; and
a second tie rod connection portion connected to the second tie rod.

10. The vehicle of claim 7, wherein the first tie rod, second tie rod, pitman arm link, pitman connector, and pitman arm are below the frame of vehicle when the vehicle is in an in-use orientation.

11. The vehicle of claim 7, wherein the pitman arm link is mounted to a U-shaped portion of the frame via pitman arm link bracket.

12. The vehicle of claim 7, wherein the first knuckle rotatably mounted to a first arm of the vehicle frame and second knuckle is rotatably mounted to a second arm of the vehicle frame, wherein the first arm and second arm are connected to respective first and second sides of a U-shaped portion of the vehicle frame.

13. The vehicle of claim 7, wherein the first tie rod, second tie rod, pitman arm link, and pitman connector are below the U-shaped portion of the frame when the vehicle is in an in-use orientation.

14. The vehicle of claim 7, wherein the vehicle cargo comprises a cargo carrying portion or a passenger seat, and the U-shaped portion comprises a proximal end that is closer to the steering tube than a distal end, wherein the vehicle cargo is mounted to the distal end of the U-shaped portion, and the first tie rod, second tie rod, pitman arm link, and pitman arm connector are located closer to the proximal end of the U-shaped portion than the vehicle cargo.

15. A vehicle frame and steering system, the vehicle frame comprising:
a rear wheel mount;
a seat tube;
a steering tube extending along a first axis;
a first arm extending from a first portion of the frame and having a first knuckle mounted thereto; and
a second arm extending from a second portion of the frame and having a second knuckle mounted thereto, wherein the first and second knuckles are connected to the steering system, the steering system comprising:
a pitman arm link rotatably connected to the frame and configured to rotate about a second axis, wherein the pitman arm link includes a first tie rod connection portion and a second tie rod connection portion distal from the first tie rod connection portion;
a first tie rod extending between and connected to the pitman link at the first tie rod connection portion and connecting the first knuckle to the pitman arm link;
a second tie rod extending between and connected to the second tie rod connection portion and connecting the second knuckle to the pitman arm link via the second tie rod connection portion, wherein the first axis and the second axis are not coaxial; and
a pitman arm rotatably connected to the vehicle frame, wherein the pitman arm is connected to, and rotates in response to a steering input from a user of the vehicle; and
a pitman connector connecting the pitman arm link and the pitman arm.

16. The vehicle frame and steering system of claim 15, wherein the first knuckle is rotatably connected to the first tie rod and the second knuckle is rotatably connected to the second tie rod, wherein the first and second tie rod are rotatably connected to the pitman arm link.

17. The vehicle frame and steering system of claim 15, wherein the pitman arm link comprises:
   a first tie rod connection portion connected to the first tie rod;
   a second tie rod connection portion connected to the second tie rod; and
   a pitman connector connection portion connected to a pitman connector.

18. The vehicle frame and steering system of claim 17, wherein pitman connector portion is connected to a pitman arm that rotates about the first axis.

19. The vehicle frame and steering system of claim 15, wherein the pitman arm link is mounted to a U-shaped portion of the frame via pitman arm link bracket.

20. The vehicle frame and steering system of claim 15, wherein the first and second arms extend from a U-shaped portion of the vehicle frame, wherein the first tie rod, second tie rod, pitman arm link, and pitman connector are below the U-shaped portion of the frame when the vehicle frame is in an in-use orientation.

\* \* \* \* \*